June 19, 1951 D. S. REITZ 2,557,142
REFUSE TRUCK TAILGATE
Filed Dec. 7, 1948 5 Sheets-Sheet 1

INVENTOR
Donald S. Reitz
BY
his ATTORNEY

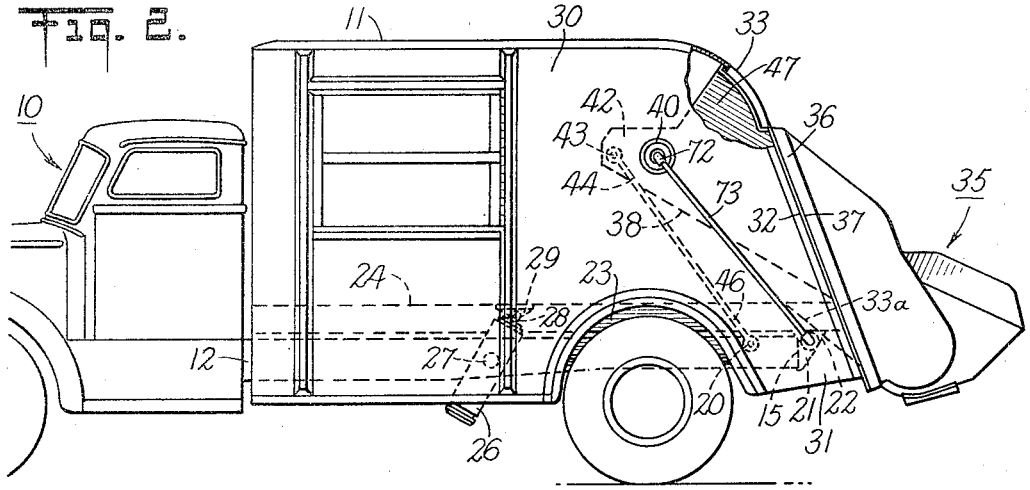
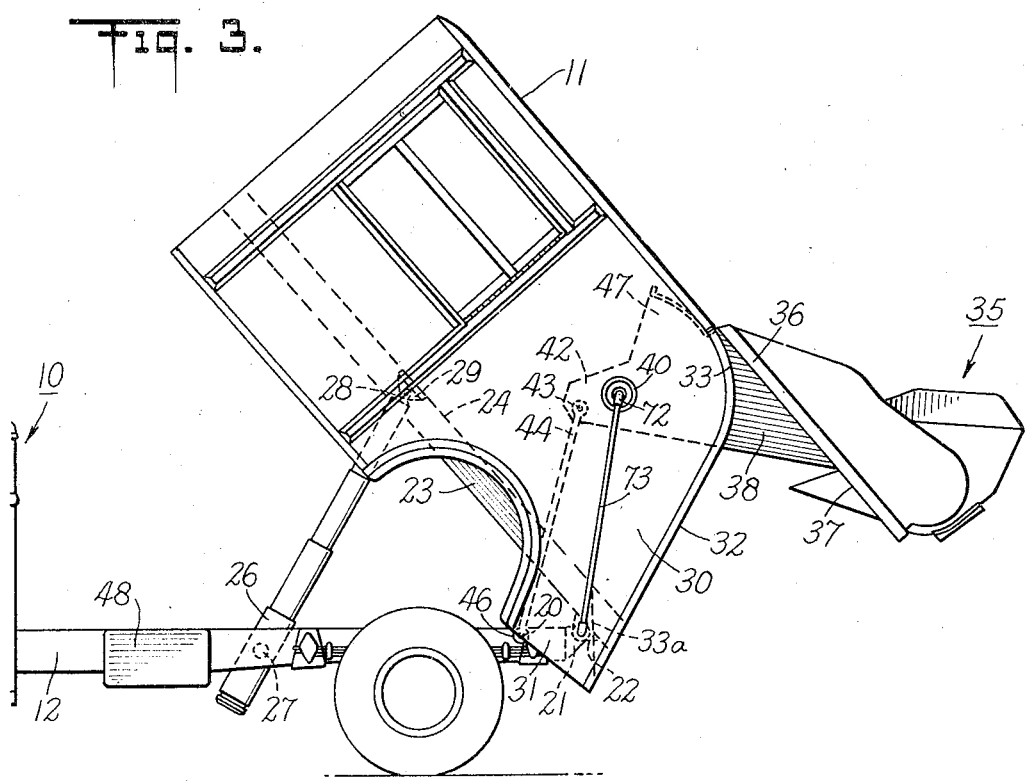

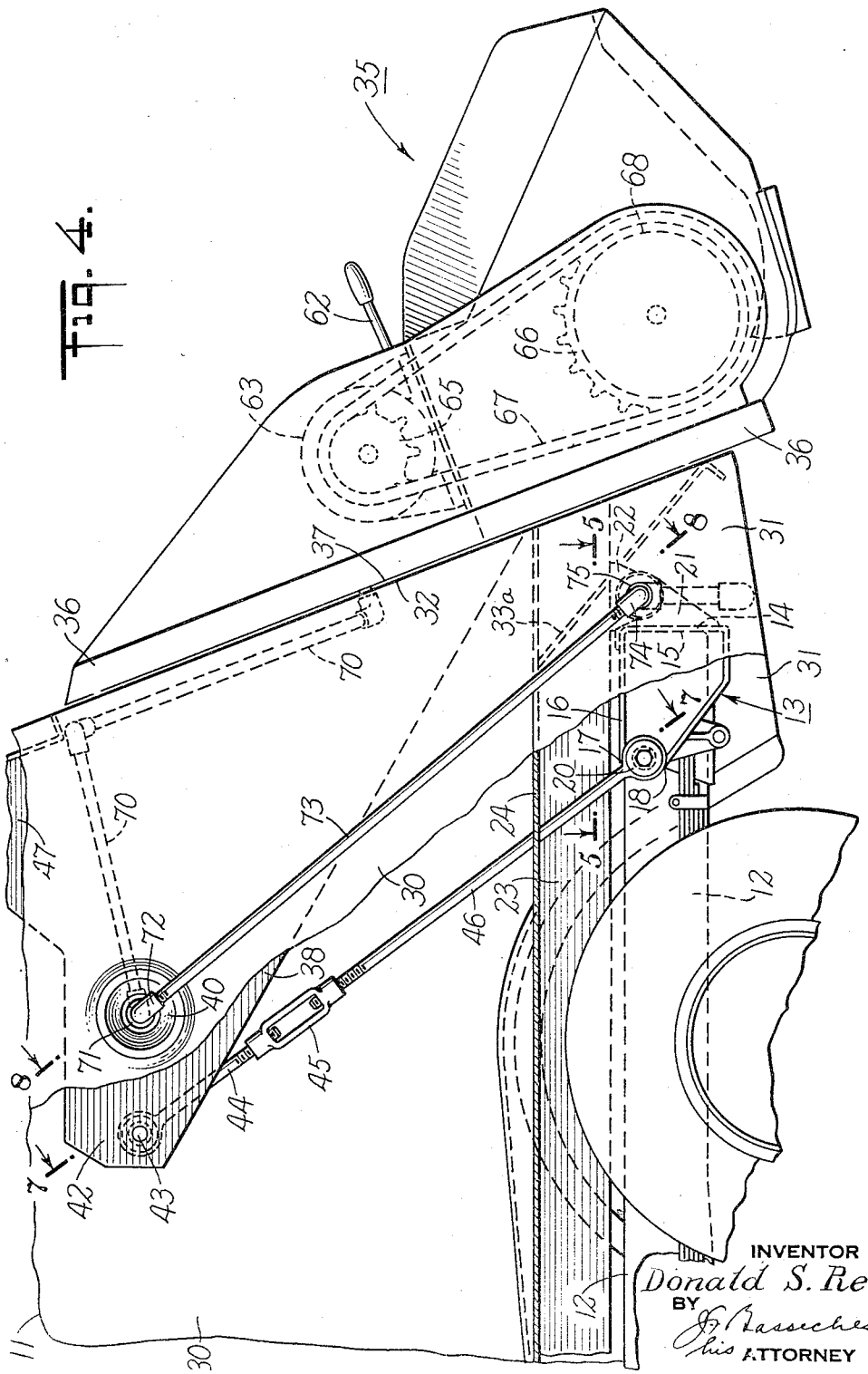

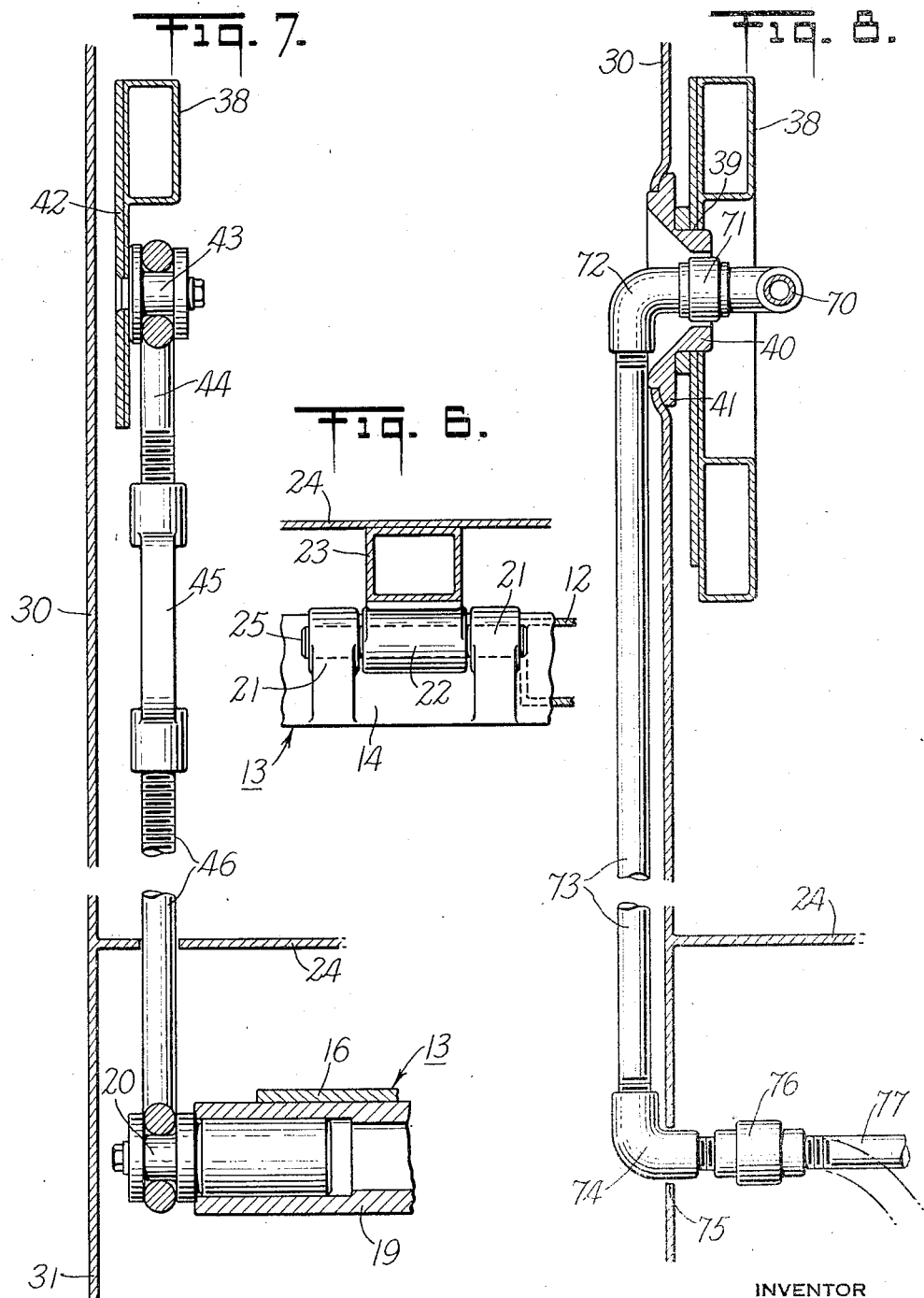

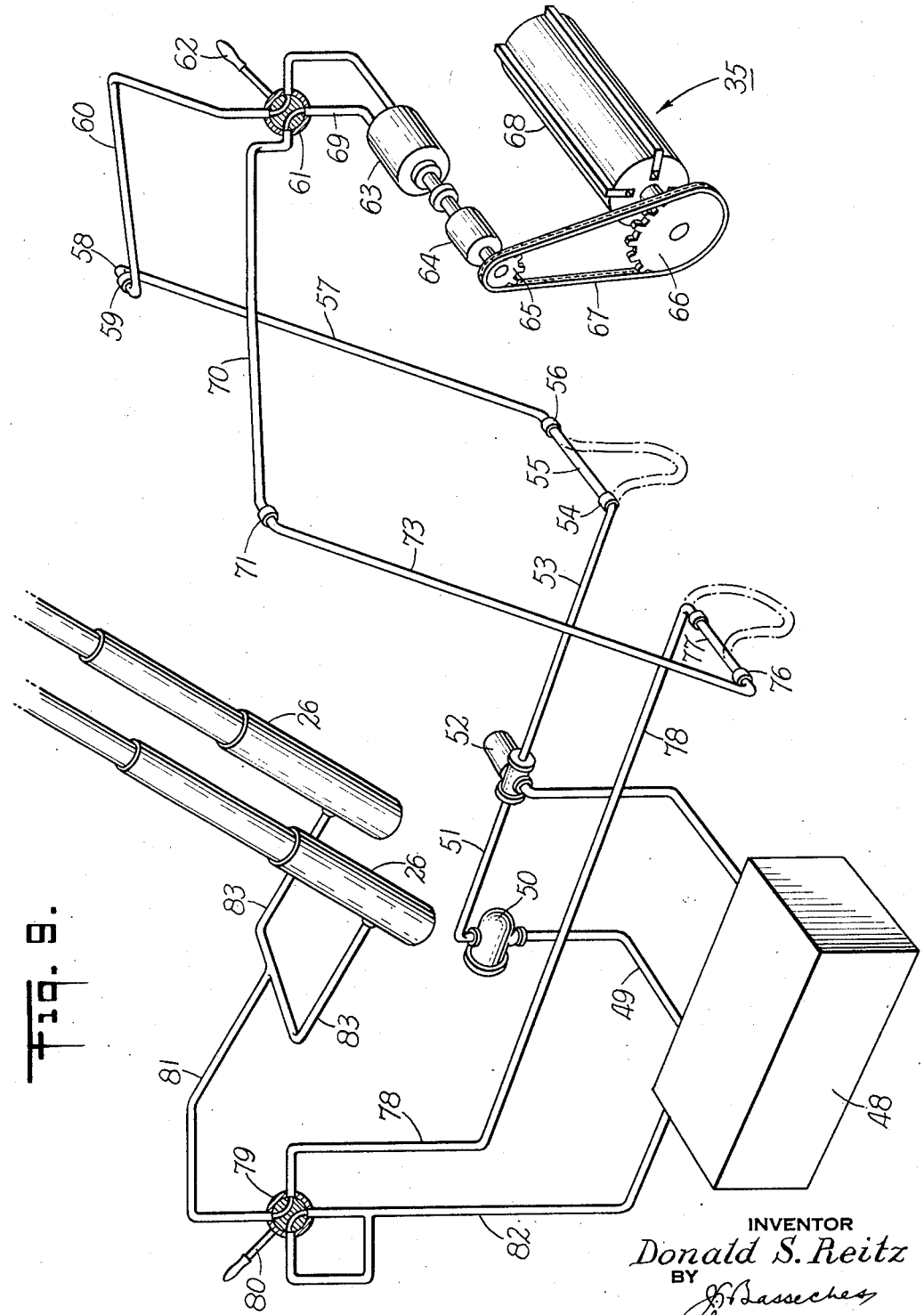

Patented June 19, 1951

2,557,142

UNITED STATES PATENT OFFICE 2,557,142

REFUSE TRUCK TAIL GATE

Donald S. Reitz, South Hempstead, N. Y., assignor to City Tank Corporation, Corona, N. Y., a corporation of New York Application December 7, 1948, Serial No. 63,974

5 Claims. (Cl. 214—83.3)

This invention relates to truck bodies, and more particularly to dump truck bodies and still more particularly to dump truck bodies having charge loading and compacting means.

This invention in one of its phases relates to vehicle bodies for trucks, and novel structural elements thereof, particularly refuse trucks including power driven means for tipping the body for dumping the contents and coordinately involves the provision of power driven means for tilting the body and opening the tailgate structure whereby the same motive power assembly may be employed to tilt the body and open the tailgate structure.

Still more particularly, the invention relates to the provision of a refuse truck having a tailgate construction including power driven packing means thereon and coordinately combines the power driven means for the packers with the power means for tilting the truck body whereby the controls for the manipulation of the truck tilting mechanism and the conduction of the motive power for the tailgate packing means may be simplified to effect relatively fool-proof operation and economic advantages.

To attain these objects and such further objects as may appear herein, or be hereinafter pointed out, I make reference to the accompanying drawing forming a part hereof, in which—

Figure 2 is a side elevation thereof in the closed position;

Figure 3 is a fragmentary side elevation in the dumping position;

Figure 4 is a magnified fragmentary side elevation of the truck in the closed position;

Figure 6 is a fragmentary section taken in the direction of lines 6—6 of Figure 5;

Figure 7 is a fragmentary section taken on the line 7—7 of Figure 4;

Figure 8 is a fragmentary section taken on the line 8—8 of Figure 4;

Figure 9 is a perspective diagrammatic view of the control and power transmitting mechanism.

Figure 1:
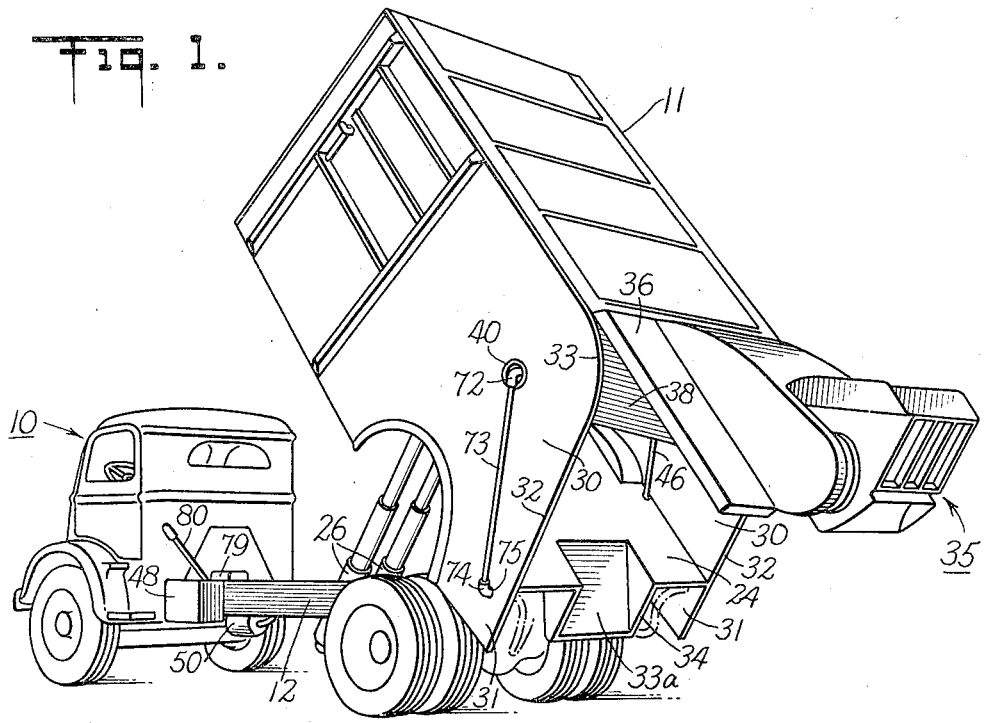
Figure 1 is a perspective view of the truck in accordance with the present invention in the dumping position.
Figure 5:
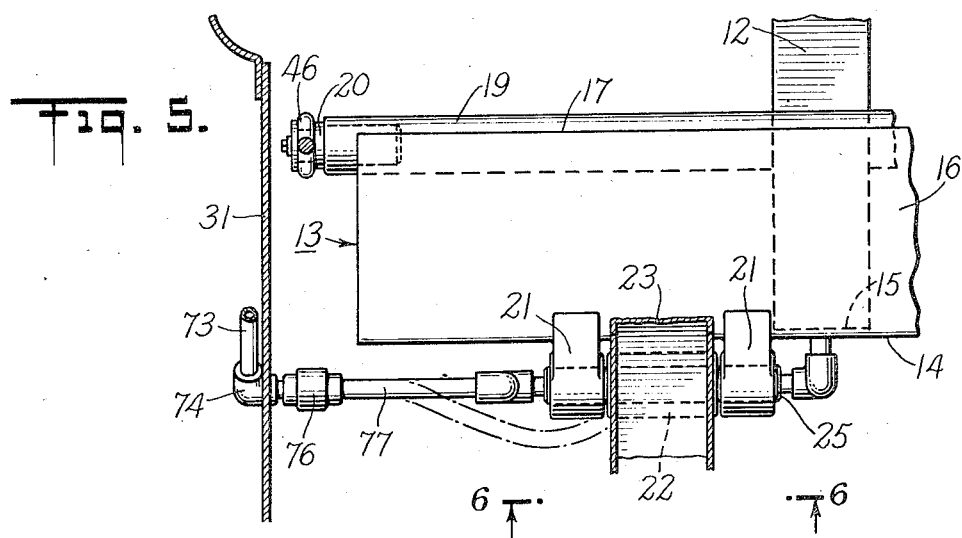
Figure 5 is a section taken on the line 5—5 of Figure 4.

The present invention has its specific utility in connection with a dump truck body of a refuse collection truck embodying a tailgate having a power driven loader described and disclosed in the application of Lawrence S. Thomas and Thomas Edwards, Serial No. 21,734, filed April 17, 1948, entitled Refuse Truck Loader.

As in the aforementioned application there is provided a truck 10 having a body 11, supported on the chassis 12. The chassis terminates in a cross beam 13 made by bending a plate into a five-sided tubular member, the front wall whereof is folded over the end 15 of the chassis beam. The upper wall 16 has its end 17 meeting the edge 18 for supporting the tubular axle 19. The axle 19 is welded to the edges 17 and 18 previously described and is fitted at its opposed ends with the pull rod hubs 20, for purposes which will appear as this description proceeds. The front wall 14 has pairs of spaced brackets 21, between each pair of which there is mounted the floor bracket 22, welded to the beam 23 supporting the floor or truck body bottom 24. A cross pin or tube 25, passing through the brackets, trunnions the truck body to the chassis beams 12.

A pair of hydraulic rams hoist cylinders 26 are supported by the pivots 27 on the chassis 12 at one end thereof. The telescopic or extensible ends 28 are coupled by the brackets 29 to the floor beams 23, to move the truck body to and from the dumping position, as will appear hereinafter. The floor or truck body bottom 24 supports upwardly extending side walls 30 whose lower edges 31 overhang the bottom 24 to each side of the cross beam 13 and the tubular axle 19 supported thereby. The side walls 30 have angularly directed edges 32, merging into arcuately directed portions 33.

The floor 24 has an angularly directed floor extension 33a, the edges whereof 34 are contoured to envelop the power driven loader 35 carried by the tailgate 36. The tailgate 36 has contacting edges 37 complemental to the edges 32, previously described. Side arms 38, including bearing portions 39 are trunnioned on the hub 40, the periphery of which is supported and attached in the wall 30 by suitable means such as by providing the hub assembly 40 with a flange 41 having a stepped periphery to receive the side wall plates 30. The side arms 38 have extensions 42 and carry a pull rod hub 43 passing through the floor plates 24 for coupling the pull rod segment 44 to the turn buckle 45 connected to the lower segment 46 which, in turn, is connected to the lower hub 20 mounted on the axle 19. The side arms 38 include arcuately terminating wings 47 having an extension apron conforming to the arcuate edges 33 with peripheral upstanding flanges to seal the tailgate opening in all positions of the tailgate assembly, as will appear hereinafter.

From the construction described, it will be observed that the truck is provided with support by reason of the hinges supported on the brackets 21. These supports are spaced from the axle 19 and the pull rod anchor point which is provided by the hubs 29. This arrangement produces a differential pivotal movement which is transmitted to the arms 38 upon the truck body 11 assuming the tilting position, to elevate the tailgate, as more clearly shown in Figures 1 and 3.

Referring now to Figure 9, there is shown diagrammatically illustrated, the hydraulic system 10 including the oil reserve chamber 48 feeding through the pipe line 49 the hydraulic fluid or oil to the pump 50, and through the pipe line 51, through the relief valve 52 to the pipe line 53, running longitudinally of the truck, along the left hand beam of the truck. A pivot pipe joint 54 is co-axially positioned with the rear body hinge and then by the transverse pipe section 55 to the pivot point 56 leading to the feed line 57 through the left hand plate 30, to the elbow 58 directed axially through the left hand hub 40.

The passage through the elbow 58 continues through the pivotal pipe joint 59 to the pivotal pipe section 60 feeding the valve 61 under the manual control lever 62 for the hydraulic motor 63, coupled to the reducing gear 64 operating through the sprockets 65, 66 and the chain drive 67, the rotary loader mechanism 68. The return of the hydraulic fluid from the motor 63 is through the pipe line 69, the valve 61 for connecting through the pipe line 70 through the pivot joint 71 directing the pipe line through the boring of the hub 40 of the right hand side of the truck and through the elbow 72 and line 73 connecting with the pipe elbow 74 leading through a passage 75 to the pivotal pipe joint 76 of the transverse side branch 77 co-axially positioned with the rear body hinge joined by the cross pin 25.

The side branch 77 may be made of flexible coupling hose, as shown in dotted line. It is preferred, however, to have the transverse branches 55 and 77 rigid hinging pipe sections co-axial with pivot point of the rear body hinge. The return pipe line 78 leads to the hoist control valve 79 having the manual control lever 80 for alternatively coupling the valve mechanism to permit the flow of oil to the line 81 or the line 82, the pipe line 82 being understood to be the return line to the oil reservoir 48. The line 81 has split sections 83—83 for feeding the hydraulic hoist rams 26—26 for hoisting the truck body.

It will be observed from the installation just described that the manually controlled valve 61 may be alternatively set to feed hydraulic power to the motor 63 and the hoist rams 26 or connect in series the loader motor 63 with the hoist rams 26, whereby during hoisting, the loader will be placed in operation to rotate and to clean itself during the dumping position of the truck. A one direction or series flow system of oil or power is thereby provided for dumping and cleaning simultaneously the truck body and loader.. The co-axial positioning of the transverse branches 55 and 77 with the truck body hinge permits of the dumping operation just described without restraint or wear on the parts.

It will be observed that from the construction described, the nesting of the side branches 38 for the tailgate within the body and the arcuate extension of the wing portion 47 and telescopic hood during movement in hoisting the body, articulates the inter-nesting parts to be self-cleansing and to dislodge any debris on this moving element.

It will also be observed that by the construction described, a single control may be obtained for the hoisting of the truck body for dumping and for supplying the motive power for the loading unit, to coordinate the hoisting action for dumping of the truck with the articulating action for dislodging debris from the tailgate parts, while rotating the loader unit for dislodging and cleansing the loader mechanism.

Having thus described my invention and illustrated its use, what I claim as new and desire to secure by Letters Patent, is:

1. In a refuse collecting truck, the combination comprising a chassis, a refuse body thereon, hinge means on said chassis cooperatively connected with hinge means on the body for tilting the body for dumping, a tailgate mounted on said body, hinge means for said tailgate connected to said refuse loader carried on said tailgate, hydraulic power means mounted on said tailgate and connected to rotary transmission means for actuating said loader, hydraulic means connected to the chassis for tilting said body, said body tilting means and loader having feed lines connected in series to hydraulic supply means and a common manual control for said supply means for providing a common control for tilting the body and actuating the hydraulic power means for the loader whereby said loader may be actuated simultaneously with the tilting movement of said body whereby during hoisting, the power means for the loader will be rotated and be placed in operation to rotate the loader means and to have it clean itself of the residual contents while the truck body is being emptied.

2. In a refuse collecting truck comprising a chassis, a cross beam at the end of said truck including hinge means cooperating with hinge means on the body for holding said body tiltably on said chassis, a tailgate including trunnions for tiltably supporting said tailgate adjacent the top of the body, mounted on side arms of said tailgate extending in nested position within said body and extension arms including tie-rods connected to said cross beam anchored in spaced relation to said hinge supports, power means for tilting said body whereby to move the tailgate to the open position when tilting the truck body to the dumping position.

3. In a refuse collecting truck, the combination comprising a chassis, longitudinal beams, the ends of which carry a cross beam having hinge supports forwardly thereof and an anchoring axle member rearwardly thereof, a truck body hinged to said supports for tilting, side plates extending from said body and having floor section plates connected thereto and encasing said cross beam, a tailgate, side arms on said tailgate extending in nested position within said body, bearing portions on said side arms, a hub on said plates into which said bearings are trunnioned, said tailgate having a hydraulically powered loader and a line for said loader extending through said hub, hydraulic lifting means for said body having a common control for said loader.

4. In a refuse collecting truck, the combination comprising a chassis, longitudinal beams, the ends of which carry a cross beam having hinge supports forwardly thereof and an anchoring axle member rearwardly thereof, a truck body hinged to said supports for tilting, side plates extending from said body and having floor section plates connected thereto and encasing said cross beam, a tailgate hinged from the top portion of said body, side arms on said tailgate extending in nested position within said body, bearing portions on said side arms, a hub on said plates into which said bearings are trunnioned, and lifting means for said body.

5. In a refuse collecting truck, the combination comprising a chassis, longitudinal beams, the ends of which carry a cross beam having hinge supports forwardly thereof and an anchoring axle member rearwardly thereof, a truck body hinged to said supports for tilting, side plates extending from said body and having floor section plates connected thereto and encasing said cross beam, a tailgate, side arms on said tailgate extending in nested position within said body, bearing portions on said side arms, a hub on said plates into which said bearings are trunnioned, hydraulic lifting means for said body and tie-rods, the opposite ends whereof pass through said floor section plates and connected to said cross beam and side arms respectively.

DONALD S. REITZ.

REFERENCES CITED

The following references are of record in the file of this patent:

UNITED STATES PATENTS

| Number | Name | Date |
| --- | --- | --- |
| 1,288,678 | Raymond | Dec. 24, 1918 |
| 1,961,193 | Brumbaugh | June 5, 1934 |
| 1,977,621 | Burner | Oct. 23, 1934 |
| 2,062,924 | Ochsner | Dec. 1, 1936 |
| 2,151,886 | Barrett | Mar. 28, 1939 |
| 2,252,608 | Ballert | Aug. 12, 1941 |
| 2,316,826 | Wachter | Apr. 20, 1943 |
| 2,430,973 | Boissonnault | Nov. 18, 1947 |
| 2,509,388 | Biszantz | May 30, 1950 |

FOREIGN PATENTS

| Number | Country | Date |
| --- | --- | --- |
| 475,456 | France | 1915 |
| 825,873 | France | Dec. 16, 1937 |
| 219,367 | Switzerland | 1942 |